(12) United States Patent
Han et al.

(10) Patent No.: US 10,885,770 B2
(45) Date of Patent: Jan. 5, 2021

(54) METHOD AND APPARATUS FOR CONTROLLING DEVICE IN COMMUNICATION SYSTEM

(71) Applicant: SAMSUNG ELECTRONICS CO., LTD., Suwon-si (KR)

(72) Inventors: Ji-Yeon Han, Suwon-si (KR); Jong-Hyuk Jang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 125 days.

(21) Appl. No.: 16/068,625

(22) PCT Filed: Jan. 6, 2017

(86) PCT No.: PCT/KR2017/000228
§ 371 (c)(1),
(2) Date: Jul. 6, 2018

(87) PCT Pub. No.: WO2017/119784
PCT Pub. Date: Jul. 13, 2017

(65) Prior Publication Data
US 2019/0019401 A1    Jan. 17, 2019

(30) Foreign Application Priority Data
Jan. 8, 2016   (KR) .................. KR10-2016-0002447

(51) Int. Cl.
*G06F 15/16* (2006.01)
*G08B 27/00* (2006.01)
(Continued)

(52) U.S. Cl.
CPC ........... *G08B 27/003* (2013.01); *G08B 21/02* (2013.01); *G08B 21/10* (2013.01); *G08B 25/10* (2013.01);
(Continued)

(58) Field of Classification Search
CPC .................................................... G08B 27/003
(Continued)

(56) References Cited

U.S. PATENT DOCUMENTS 6,445,300 B1   9/2002  Luman
8,089,353 B2   1/2012  Tarng et al.
(Continued)

FOREIGN PATENT DOCUMENTS

JP        10-334367 A     12/1998
JP      2008-152439 A      7/2008
(Continued)

OTHER PUBLICATIONS

Search Report dated Apr. 13, 2017, issued by the International Searching Authority in counterpart International Patent Application No. PCT/KR2017/000228 (PCT/ISA/210).
(Continued)

*Primary Examiner* — Anthony Mejia
(74) *Attorney, Agent, or Firm* — Sughrue Mion, PLLC (57) ABSTRACT

The present disclosure relates to a method and apparatus for controlling a neighboring device on the basis of a disaster message in a communication system. An embodiment of the present invention proposes a method for controlling, by a portable terminal, at least one device which can be connected and communicate with the portable terminal, in a communication system, the method comprising the steps of: acquiring situation information; when the acquired situation information includes risk information, selecting at least one device to be controlled according to the risk information; and transmitting a control signal corresponding to the risk information to the at least one selected device.

20 Claims, 10 Drawing Sheets

(51) Int. Cl.
| | |
|---|---|
| *H04W 4/90* | (2018.01) |
| *G08B 25/10* | (2006.01) |
| *G08B 21/02* | (2006.01) |
| *G08B 25/14* | (2006.01) |
| *G08B 21/10* | (2006.01) |
| *H04W 4/80* | (2018.01) |
| *H04L 29/08* | (2006.01) |
| *H04L 29/06* | (2006.01) |

(52) U.S. Cl.
CPC ............ *G08B 25/14* (2013.01); *G08B 27/00* (2013.01); *H04L 67/125* (2013.01); *H04L 67/26* (2013.01); *H04L 69/22* (2013.01); *H04W 4/80* (2018.02); *H04W 4/90* (2018.02)

(58) Field of Classification Search
USPC .......................................................... 709/206
See application file for complete search history.

(56) References Cited

U.S. PATENT DOCUMENTS

| | | | | |
|---|---|---|---|---|
| 8,880,019 | B1* | 11/2014 | Daly | H04L 12/1895 455/404.1 |
| 10,102,585 | B1* | 10/2018 | Bryant | G06Q 50/16 |
| 10,249,158 | B1* | 4/2019 | Jordan, II | G08B 13/22 |
| 10,565,845 | B1* | 2/2020 | Beyer | G08B 25/005 |
| 2003/0097188 | A1* | 5/2003 | O'Mahoney | G08B 25/04 700/17 |
| 2007/0072544 | A1 | 3/2007 | Kim | |
| 2008/0081646 | A1* | 4/2008 | Morin | H04W 4/12 455/466 |
| 2009/0002085 | A1 | 1/2009 | Tarng et al. | |
| 2009/0154659 | A1* | 6/2009 | Morin | H04M 3/5116 379/48 |
| 2010/0003946 | A1* | 1/2010 | Ray | H04M 3/5116 455/404.1 |
| 2011/0087510 | A1* | 4/2011 | Putra | G06Q 10/06311 705/7.13 |
| 2012/0146809 | A1* | 6/2012 | Oh | G07C 5/085 340/901 |
| 2012/0190295 | A1 | 7/2012 | Kim et al. | |
| 2012/0309340 | A1* | 12/2012 | Ray | H04M 1/72552 455/404.2 |
| 2013/0109344 | A1* | 5/2013 | Ung | H04W 4/90 455/404.2 |
| 2014/0002241 | A1* | 1/2014 | Elghazzawi | G06Q 50/22 340/8.1 |
| 2014/0287711 | A1* | 9/2014 | Williams | H04W 4/12 455/404.1 |
| 2015/0140990 | A1 | 5/2015 | Kim et al. | |
| 2015/0248832 | A1* | 9/2015 | Piccolo, III | G08B 29/145 340/514 |
| 2015/0334545 | A1* | 11/2015 | Maier | H04W 4/025 455/404.2 |
| 2016/0005293 | A1 | 1/2016 | Yoo et al. | |
| 2016/0065737 | A1* | 3/2016 | Williams | H04M 1/72538 455/404.1 |
| 2016/0209907 | A1 | 7/2016 | Han et al. | |
| 2017/0133844 | A1* | 5/2017 | Goldin | G08B 17/06 |
| 2017/0251347 | A1* | 8/2017 | Mehta | H04W 4/08 |
| 2018/0310159 | A1* | 10/2018 | Katz | H04M 3/4217 |
| 2020/0128383 | A1* | 4/2020 | Maier | H04M 1/72538 |

FOREIGN PATENT DOCUMENTS

| | | |
|---|---|---|
| KR | 2002-0003669 A | 1/2002 |
| KR | 10-2007-0035871 A | 4/2007 |
| KR | 10-2010-0055746 A | 5/2010 |
| KR | 10-2012-0084560 A | 7/2012 |
| KR | 10-1313138 B1 | 10/2013 |
| KR | 10-1437467 B1 | 9/2014 |
| KR | 10-2015-0022237 A | 3/2015 |
| KR | 10-2015-0033241 A | 4/2015 |
| WO | 2014/088143 A1 | 6/2014 |
| WO | 2015/026197 A1 | 2/2015 |

OTHER PUBLICATIONS

Written Opinion dated Apr. 13, 2017, issued by the International Searching Authority in counterpart International Patent Application No. PCT/KR2017/000228 (PCT/ISA/237).

* cited by examiner

| LOCATION OF HOST DEVICE | TYPE OF RISK | NEIGHBORING DEVICE TO BE CONTROLLED | CONTROL SIGNAL |
|---|---|---|---|
| COMPANY | COLD WAGE | [HOUSE] WINDOW<br>[HOUSE] HEATING<br>[HOUSE] WATERWORKS | <br>ON<br>ON |
| HOUSE | EARTHQUAKE | TERMINAL (PHONE)<br><br>[HOUSE] ELECTRIC POWER<br>[HOUSE] GAS<br>[HOUSE] RADIO<br>[HOUSE] OTHER ELECTRONIC PRODUCTS<br>[COMPANY] PC | EMERGENCY MODE (RESCUE REQUEST)<br><br>OFF (SHUT OFF)<br>OFF (SHUT OFF)<br>ON (BROADCASTING)<br>OFF<br>UPLOAD |

METHOD AND APPARATUS FOR CONTROLLING DEVICE IN COMMUNICATION SYSTEM

PRIORITY

This application is a National Phase Entry of PCT International Application No. PCT/KR2017/000228, which was filed on Jan. 6, 2017, and claims priority to Korean Patent Application No. 10-2016-0002447, which was filed on Jan. 8, 2016, the contents of which are incorporated herein by reference.

TECHNICAL FIELD

The present disclosure relates to a method and apparatus for controlling a device based on risk information in a communication system.

BACKGROUND ART

A conventional alarm system notifies a resident or a user of a building of a risk situation by generating an alarm in a predetermined sensor if the risk situation (i.e., a risk situation such as fire, an earthquake, a gas leak, and/or the like within a house, a building, and/or the like) occurs. The conventional alarm system continuously provides an alarm sound or a visual alarm light at an area (or a space) where the risk situation occurs, however, a case that the conventional alarm system may not quickly cope with the risk situation occurs if a user is unable to control neighboring devices according to the risk situation (for example, if the user is not at an area (or a space) where a risk occurs and the user suffers from the risk).

DETAILED DESCRIPTION OF THE INVENTION

Technical Problem

An embodiment of the present disclosure provides a method and apparatus for controlling a neighboring device based on a message including situation information in a communication system.

An embodiment of the present disclosure provides a method and apparatus for controlling a neighboring device according to a risk situation in a communication system.

Technical Solution

An embodiment of the present disclosure proposes a method for controlling, by a portable device, at least one device capable of communicating with the portable device in a communication system, and the method includes obtaining situation information, if risk information is included in the obtained situation information, selecting at least one device to be controlled corresponding to the risk information, and transmitting a control signal which corresponds to the risk information to the selected at least one device.

An embodiment of the present disclosure proposes an apparatus for controlling at least one device capable of communicating with a portable device in a communication system, and the apparatus includes a controller configured to obtain situation information, and to select at least one device to be controlled corresponding to risk information if the risk information is included in the obtained situation information, and a communication unit configured to transmit a control signal which corresponds to the risk information to the selected at least one device.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF DRAWINGS

Throughout the drawings, it should be noted that like reference numbers are used to depict the same or similar elements, features, and structures.

MODE FOR CARRYING OUT THE INVENTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although ordinal numbers such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

The terminology used herein is for the purpose of describing various embodiments only and is not intended to be limiting. As used herein, the singular forms are intended to include the plural forms as well, unless the context clearly indicates otherwise. It will be further understood that the terms "comprises" and/or "has," when used in this specification, specify the presence of a stated feature, number, step, operation, component, element, or combination thereof, but do not preclude the presence or addition of one or more other features, numbers, steps, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

As a communication technology has been developed recently, a device using a mobile communication network or a wired/wireless internet protocol (IP) network may communicate with another device regardless of time and a place. So, an embodiment of the present disclosure provides a scheme in which a host device of a communication system identifies that a risk situation occurs, and may quickly cope with the risk situation by controlling at least one device which is in the risk situation through a communication between the host device and the at least one device which is in the risk situation.

Figure 1:
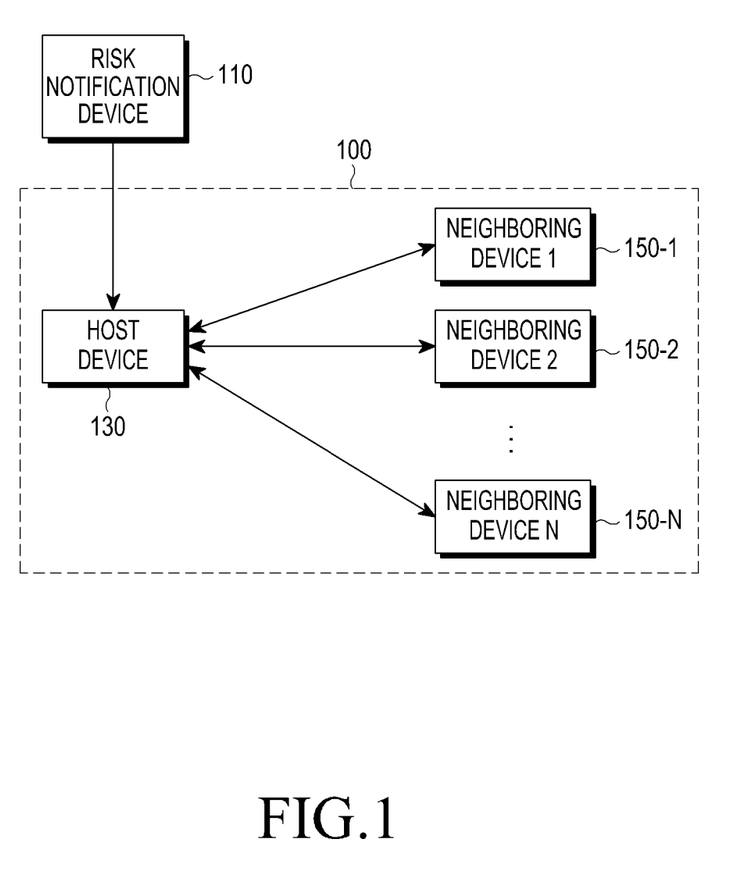
FIG. 1 is an example of a structure of a communication system according to an embodiment of the present disclosure.

FIG. 1 is an example of a structure of a communication system according to an embodiment of the present disclosure.

Referring to FIG. 1, a communication system 100 according to an embodiment of the present disclosure includes a host device 130 and at least one neighboring device 150-1, 150-2, . . . , 150-N.

The host device 130 is a device which is capable of communicating with a risk notification device 110 and the at least one neighboring device 150-1, 150-2, . . . , 150-N. For example, the host device 130 may correspond to at least one of a mobile phone, a smart phone, a personal digital assistant (PDA), a portable multimedia player (PMP), a digital camera, a music player, a portable game console, a loptop computer, a navigation system, a wearable device, a smart watch, a fitness band, and/or the like. The host device 130 may correspond to a communication terminal device which a rescuer such as a fireman uses.

Each of the at least one neighboring device 150-1, 150-2, . . . , 150-N is an electronic device which is located at a place where a risk situation may occur. The at least one neighboring device 150-1, 150-2, . . . , 150-N may correspond to one of a mobile phone, a smart phone, a personal digital assistant (PDA), a portable multimedia player (PMP), a digital camera, a music player, a portable game console, a navigation device, a laptop computer, an internet of thing (IoT) device, a wearable device, a smart watch, a fitness band, and/or the like. The at least one neighboring device 150-1, 150-2, . . . , 150-N may be a smart home appliance which has a communication function. For example, the smart home appliance may be a television, a digital video disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, a camcorder, an electronic picture frame, and/or the like. The at least one neighboring device 150-1, 150-2, . . . , 150-N may be a medical device (e.g., a magnetic resonance angiography (MRA) device, a magnetic resonance imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a naval electronic device (e.g., a naval navigation device, a gyroscope, or a compass), an avionic electronic device, a security device, an industrial or consumer robot, and/or the like.

The risk notification device 110 is a device which transmits situation information about a risk, and may correspond to, for example, at least one of a device included in a disaster agency, a server which provides an application provided to the host device 130, a server which provides a push notification message, and a server included in a building where the risk occurs. The situation information may be included in a text message including information about uniform resource locator (URL) information which may be connected on an emergency communication mode, and/or the like, a disaster text message transmitted to a mobile phone, an information message in a social network service (SNS)

(for example, Twitter, Facebook, KaKaoTalk, and/or the like), and a push message (for example, an apple push notification service (APNS)). The push message is a message which is transferred at a specific time point set by a user even though a specific application is not run. The situation information may be included in a value sensed from a sensor included in a building or a mobile terminal or a signal transmitted from a communication device in a server within the building according to determination of a risk situation based on the sensed value.

The host device 130 according to an embodiment of the present disclosure receives situation information about a risk from the risk notification device 110. The host device 130 identifies risk information based on the received situation information, and selects at least one neighboring device which needs to be controlled among the at least one neighboring device 150-1, 150-2, . . . , 150-N according to the identified risk information. The host device 130 transmits a control signal which corresponds to the identified risk information to the selected at least one neighboring device. The control signal may include information for controlling some functions for minimizing power consumption while an emergency communication is performed. The host device 130 and the selected at least one neighboring device may perform a communication each other using at least one communication method among device tagging (for example, a near field communication (NFC) and radio frequency identification (RFID)), a quick response (QR) code, a mobile communication network, zigbee, Bluetooth, Bluetooth low energy (BLE), WiFi, a ultra wide band (UWB), a visible light communication (VLC), an infrared ray (IR), a Z-wave communication, and a human body communication.

A structure of a communication system according to an embodiment of the present disclosure has been described above, and a method of controlling a neighboring device in a host device in the communication system will be described with reference to FIG. 2.

Figure 2:
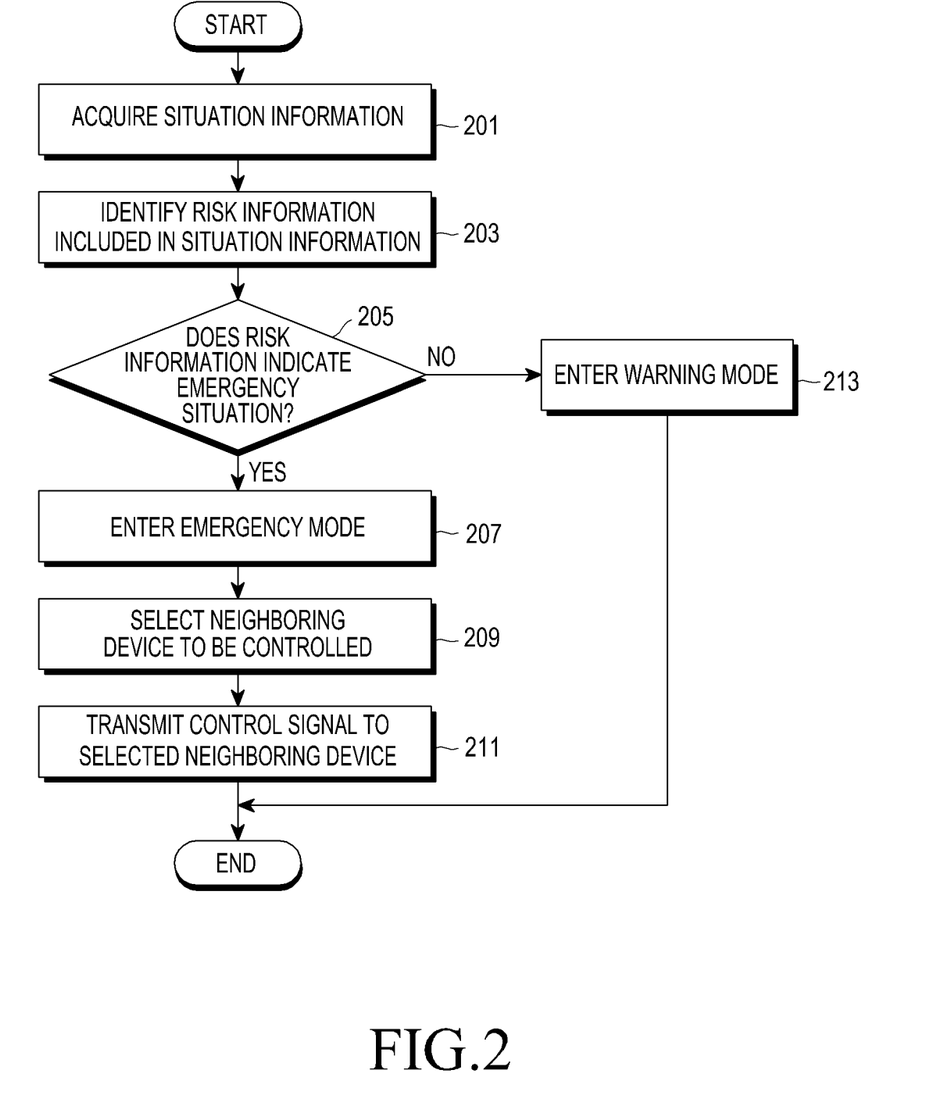
FIG. 2 illustrates an example of a method of controlling a neighboring device in a host device in a communication system according to an embodiment of the present disclosure.

FIG. 2 illustrates an example of a method of controlling a neighboring device in a host device in a communication system according to an embodiment of the present disclosure.

Referring to FIG. 2, a host device 130 obtains situation information from a message transmitted from a risk notification device 110 (201). At this time, the situation information is information transferred by one of a language or a sign. For example, the situation information may be information included in a text message received from a disaster agency, an information message provided by an SNS, a push notification message, a text message received from a server included in a building or a house where a risk occurs, and an information message provided from an IoT device, home appliances, or a security device. The host device 130 identifies risk information included in the obtained situation information (203). The host device 130 parses situation information (e.g., a text phrase) included in the received message on a word basis to identify risk information about at least one of a type of a risk, a place where the risk occurs, and scale of the risk. The kind of the risk may be classified into, for example, fire, heavy rain, a typhoon, an earthquake, heat wave, cold wave, a traffic accident, and/or the like, and the place where the danger occurs may be classified into, for example, an inside of a house, an outside of the house, an inside of a company, an outside of the company, an inside of a building, an outside of the building, an inside of a vehicle, an outside of the vehicle, and/or the like. The scale of danger denotes a degree by which the risk is progressed, and may be classified into, for example, forewarning, warning, damage, intensity, and/or the like.

Generally, a short message service (SMS) message transmitted and received between terminals may be fabricated by a user, so the host device 130 does not perform an operation of parsing a general SMS message upon receiving the general SMS message. That is, the host device 130 identifies risk information by parsing only a risk notification message transmitted from the risk notification device 110 such as a cell broadcasting service (CBS) message and a message transmitted by an earthquake and tsunami warning system (ETWS). The host device 130 determines whether the identified risk information is related to an emergency situation (205). For example, the host device 130 parses "En earthquake of intensity 5 occurs in suwon" when a text sentence "En earthquake of intensity 5 occurs in suwon" is included in a message received from the disaster notification device 110 as situation information. According to the parsed result, if terms such as "지진", "earthquake", and "地震" are included in the situation information, there is very high probability that terms such as "진도", "Intensity", "震度", and/or the like are included in the situation information, so host device 130 may identifies 'intensity N', and may determine that the risk information is related to an emergency situation if the identified N is equal to or greater than a preset threshold value, and may determine that the risk information is related to a situation which is not urgent if the identified N is less than the preset threshold value. For another example, the host device 130 parses "Tsunami occurs at 20 km off Incheon" when a text sentence "Tsunami occurs at 20 km off Incheon" is included in a message received from the disaster notification device 110 as situation information. According to the parsed result, if terms such as "해일", "tsunami", "진파", "津波", and/or the like are included in the risk information, there is very high probability that a distance from a point at which the tsunami occurs is included in the risk information, so the host device 130 identifies 'N km', and may determine that the risk information is related to an emergency situation if the identified distance N is equal to or greater than a preset threshold value, and may determine that the risk information is related to a situation which is not urgent if the identified distance N is less than the preset threshold value.

If the identified risk situation is related to the emergency situation according to the determined result, the host device 130 enters an emergency mode according to setting of a terminal (207). Specially, the host device 130 may set inner setting of the device to the emergency mode to control an inner operation such that only some functions may be performed for minimizing power consumption. For example, the host device 130 may control to activate a global positioning system (GPS) function and a wireless connection function for providing a device which a rescuer has with current location information if necessary and deactivate remaining functions. For another example, the host device 130 may control to activate a sensor for sensing biometric information and a wireless connection function for providing device which a rescuer has with health status of a user who is using the host device 130 if necessary and deactivate remaining functions. For example, the emergency mode may be automatically activated if a type of a risk is fire or an earthquake, scale of the risk is information related to "strong", or a location of the host device 130 is identical to a location where the risk occurs. For another example, the host device 130 may be activated according to a user's input if the location of the host device 130 is different from the location where the risk occurs even though the type of the risk is the fire or the earthquake and the scale of the risk is the information related to "strong".

If the risk information is not related to the emergency situation, the host device 130 may enter a warning mode (213). That is, the host device 130 sets a flag related to warning mode status during predetermined time. The host device 130 determines that it is an emergency situation if network disconnection occurs on the warning mode status, and may output a pop-up display window indicating that the host device 130 enters the emergency mode. The host device 130 may activate a menu for entering the emergency mode on the warning mode status according to a user's input. The menu for entering the emergency mode is deactivated in a case that it is not the warning mode status. For example, the warning mode may be activated if a type of a risk is heat wave, scale of the risk is forewarning, and a location of the host device 130 is different from a location where the risk occurs.

The entrance to the emergency mode or the warning mode performed at operations 207 and 211 may be performed or may not be performed according to setting of the host device 130 or a user's input.

The host device 130 selects at least one neighboring device to be controlled based on the identified risk information from a preset control list (209). The preset control list is generated based on one of a risk situation, a location of the host device 130, and user's setting. For example, the control list generated based on the risk situation may be generated as FIG. 3. The host device 130 may select at least one neighboring device to be controlled from the generated control list based on the identified risk information. For another example, the host device 130 discovers a device by advertising at least one neighboring device to be controlled within a predetermined radius where a communication is possible (e.g., within a radius from BT 50 m), and may generate or update a control list including the discovered device. The host device 130 may select at least one neighboring device to be controlled from the generated or updated control list based on the identified risk information. For another example, a user may directly generate a category, so the host device 130 may generate a control list for a neighboring device to be controlled or a control list including a neighboring device which is being currently advertised. The host device 130 may select at least one neighboring device to be controlled from the control list generated by the user based on the identified risk information.

Figure 3:
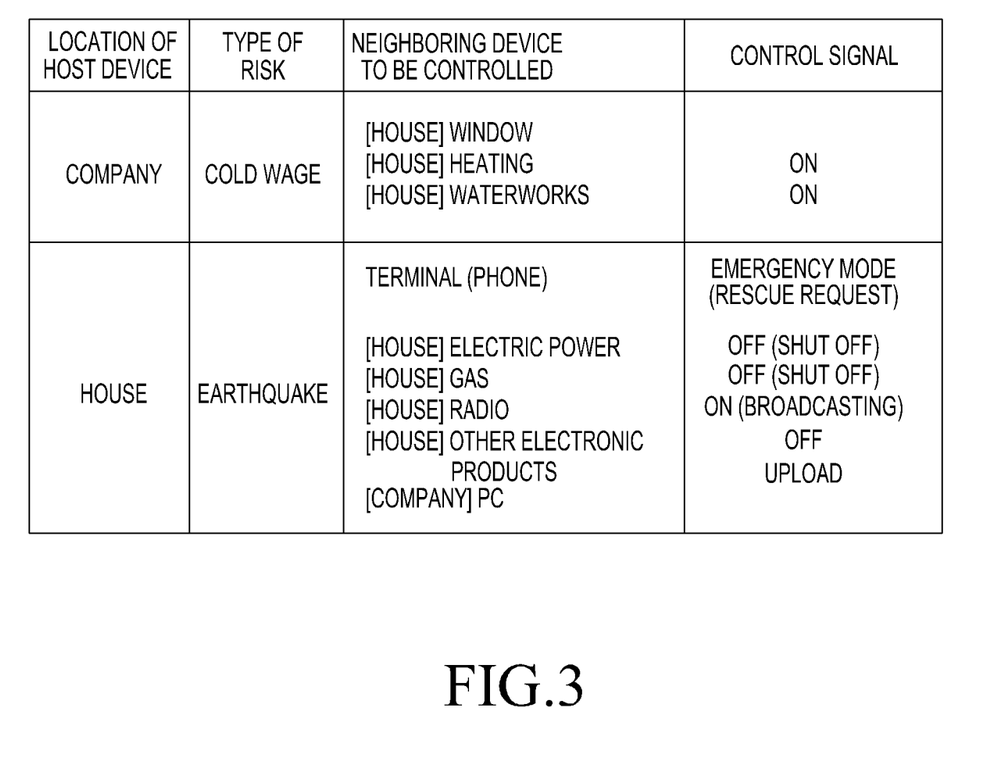
FIG. 3 illustrates an example of a control list used in a host device according to an embodiment of the present disclosure.

FIG. 3 illustrates an example of a control list used in a host device 130 according to an embodiment of the present disclosure.

Referring to FIG. 3, the control list includes information about a neighboring device which needs to be controlled according to a location of a host device 130, a place where a risk occurs and a kind of the risk, and a control signal which needs to be transmitted to the neighboring device which needs to be controlled. For example, if the location of the host device 130 is a company, the kind of the risk is cold wave, and the place where the risk occurs is a house, information indicating that neighboring devices for a window, heating and waterworks need to be controlled, and a control signal which needs to be transmitted to each of the neighboring devices which need to be controlled may be stored at the control list. The control signal which needs to be transmitted to the neighboring device which needs to be controlled includes information for power on or power off according to a kind of a risk and a type of the neighboring device which needs to be controlled.

For another example, if the location of the host device 130 is a house, the kind of the risk is an earthquake, and the place where the risk occurs is the house and a company, information indicating that devices related to electric power, gas, radio, and other electronic products which exist at the house and a personal computer (PC) which exists at the company need to be controlled, and a control signal which needs to be transmitted to each of the neighboring devices which need to be controlled may be stored at the control list. The control signal which needs to be transmitted to the neighboring device which needs to be controlled includes a control signal for power on or power off according to the kind of the risk and a kind of the neighboring device which needs to be controlled and a control signal for uploading information stored at the PC. In the another example, if the mobile terminal is included in the control list as the neighboring device which needs to be controlled, the control signal may include a control signal for outputting information which notifies a risk situation (i.e., rescue request information).

Meanwhile, a control list as shown in FIG. 3 indicates an example of a type of a risk and a place where the risk occurs, and a type of a neighboring device which needs to be controlled according to the type of the risk and the place where the risk occurs and a control signal which needs to be transmitted to the neighboring device which needs to be controlled may stored at the control list on a risk situation other than cold wave or an earthquake. If a neighboring device which exists at the place where the risk occurs is added or changed in the control list, a kind of the added or changed neighboring device and a control signal which controls the neighboring device may be updated. Further, a neighboring device which needs to be controlled and a control signal for controlling the neighboring device may be actively updated in the control list according to a case that the location of the host device 130 is within an area with control authority on a risk situation or a case that the host device 130 is a host device which may have control authority. That is, the neighboring device which needs to be controlled and the control signal for controlling the neighboring device may be updated in the control list according to the location of the host device 130.

The host device 130 transmits a corresponding control signal to the selected neighboring device based on a preset control list (211). At this time, the host device 130 may directly transmit the corresponding control signal to the selected neighboring device or may transmit the corresponding control signal to the selected neighboring device through a server (e.g., a home gateway) based on the preset control list. The control signal is a signal for overcoming a risk situation based on at least one of a location of the host device 130, a type of a risk, a place where the risk occurs, a function of the selected neighboring device (i.e., the neighboring device which needs to be controlled), and a service which may be provided in the selected neighboring device. For example, the control signal is a signal for controlling to transition the selected neighboring device to a risk mode, to take on or take off power of the selected neighboring device, to perform a predefined function (e.g., to upload data stored at a device to a server) at the selected neighboring device, or to operate the selected neighboring device according to user's setting based on at least one of the type of the risk, the function of the selected neighboring device, and the service which may be provided in the selected neighboring device. The control signal may include information instructing to activate only some functions for minimizing power consumption while an emergency communication is performed on an emergency situation. That is, the host device 130 generates a control signal indicating functions to be activated in the selected neighboring device based on risk information. For example, a control signal may be generated for activating a GPS function and a wireless connection function such that user's location information may be provided to a rescuer through the selected neighboring device if necessary and remaining functions may be deactivated. Further, control signal may be generated for activating a sensor for sensing user's biometric information and a wireless connection function such that user's health status may be provided to a rescuer through the selected neighboring device if necessary and remaining functions may be deactivated. The control signal has been described as an example. If it is predicted that an emergency communication is maintained during a long period, battery status of a corresponding device is continuously checked, and control signal may be generated as a form in which additional functions are minimized or by combining whether to activate functions other than the additional functions and whether to deactivate the functions other than the additional functions according to battery charging status.

From this, the host device 130 may quickly cope with a risk situation by controlling a neighboring device which exists at a place where a risk actually occurs.

As described in FIG. 2, the host device 130 may operate on an emergency mode or a warning mode according to inner setting. An inner operation of the host device 130 may be performed as described in FIG. 4.

Figure 4:
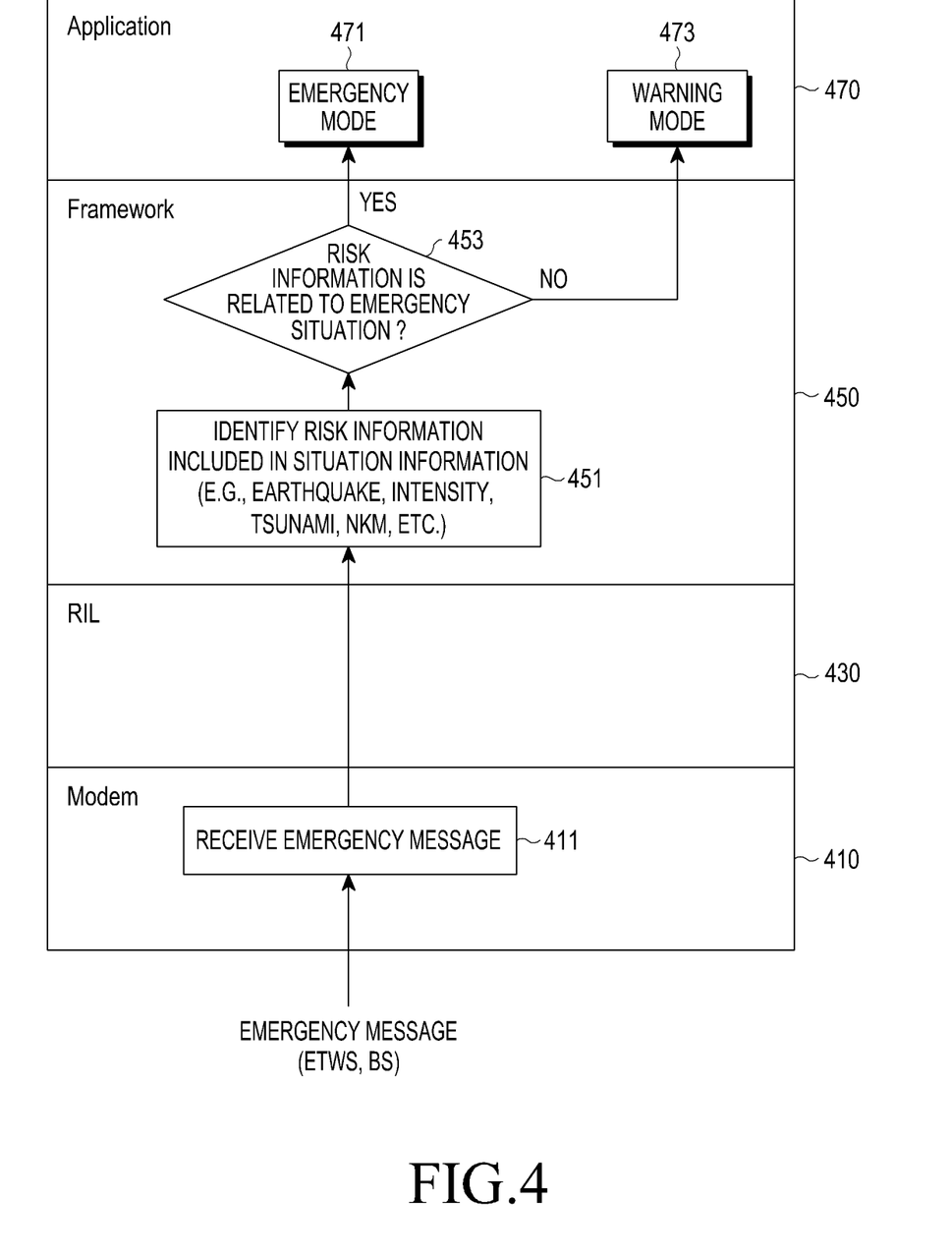
FIG. 4 illustrates an example of an inner operation of a host device in a communication system according to an embodiment of the present disclosure.

FIG. 4 illustrates an example of an inner operation of a host device in a communication system according to an embodiment of the present disclosure.

Referring to FIG. 4, a host device 130 may internally transmit and receive information or a signal through a modem layer 410, a radio interface layer (RIL) 430, a framework layer 450, and an application layer 470. The modem layer 410 of the host device 130 receives, from a disaster notification device 110, a message related to a risk such as an ETWS message and a CBS message (411). A message received in the modem layer 410 is transferred to the framework layer 450 through an interface between the modem layer 410 and the RIL 430 and an interface between the RIL 430 and the framework layer 450. In the framework layer 450, risk information is identified from situation information included in the message (451), and the identified risk information is related to an emergency situation (453). A method of determining whether the identified risk information is related to the emergency situation has been described with reference to FIG. 2, and a detailed description will be omitted herein.

If the risk information is related to the emergency situation, the framework layer 450 may transmit a control signal instructing to transition to an emergency mode to the application layer 470. If the risk information is not related to the emergency situation, the framework layer 450 may transmit a control signal instructing to transition to a warning mode to the application layer 470.

Figure 5:
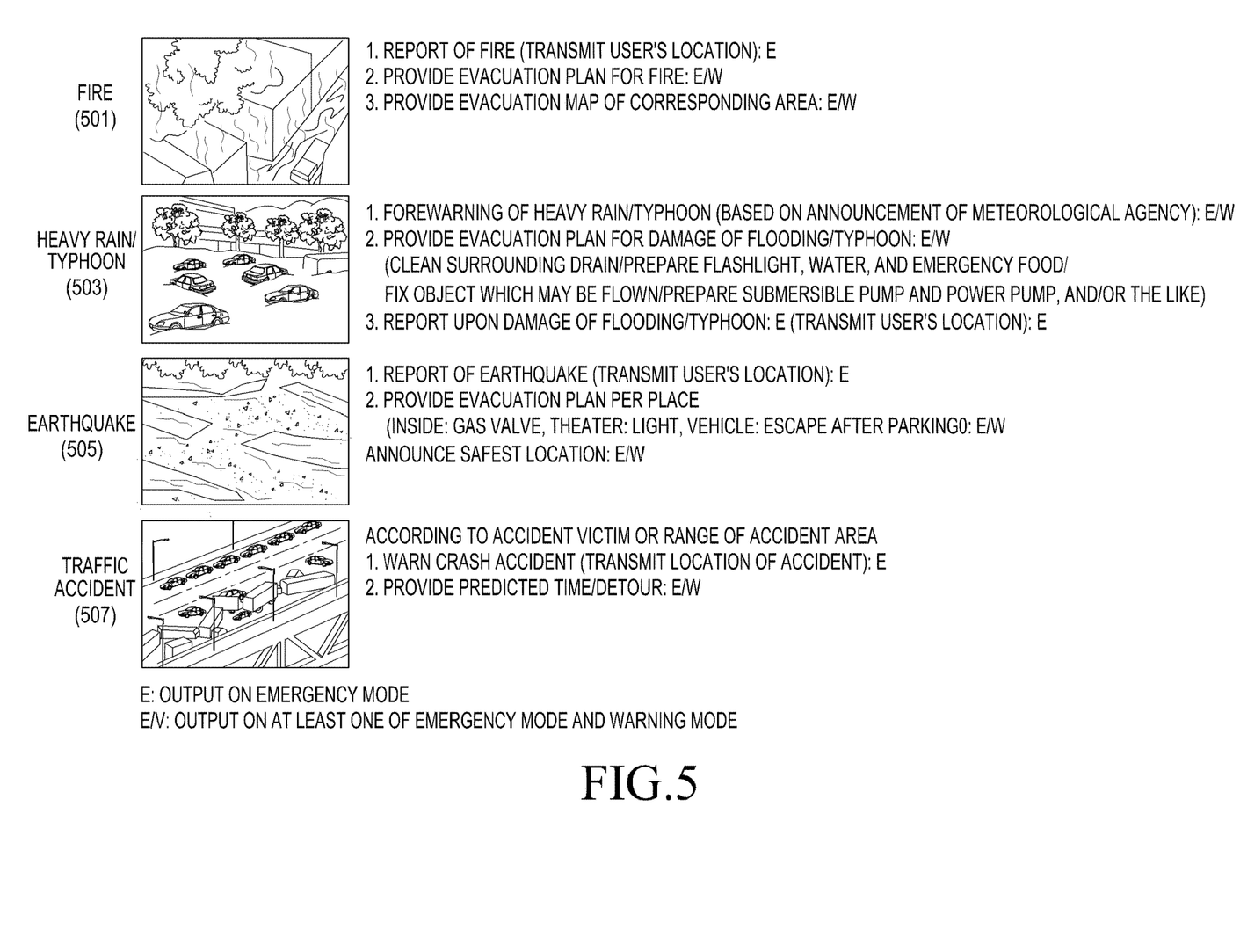
FIG. 5 illustrates an example of information output according to a type of a risk in a host device in a communication system according to an embodiment of the present disclosure.

Upon receiving the control signal instructing to the emergency mode, the application layer 470 may control a neighboring device, actively report a risk, or output information about an evacuation plan as described in FIG. 5 according to risk information. Upon receiving the control signal instructing to the warning mode, the application layer 470 may manually output information about an evacuation plan per risk type as described in FIG. 5 without controlling the neighboring device.

FIG. 5 illustrates an example of information output according to a type of a risk in a host device 130 in a communication system according to an embodiment of the present disclosure.

Referring to FIG. 5, for example, if a type of a risk is fire 501 and a place where the fire occurs is identical to a current location of a host device 130 according to a parsed result of situation information, the host device 130 enters an emergency mode to report the fire (for example, transmission of a location) to another device, or output at least one of an evacuation plan for the fire and an evacuation map of a corresponding area to an output unit. If the type of the risk is the fire 501 and the place where the fire occurs is not identical to the current location of the host device 130, the host device 130 may enter a warning mode to output at least one of the evacuation plan for the fire and the evacuation map of the corresponding area to the output unit.

For another example, if the type of the risk is related to at least one of heavy rain and a typhoon (503) and scale of the risk is forewarning according to the parsed result of the situation information, the host device 130 may enter an emergency mode or a warning mode to output scale of the heavy rain and the typhoon is the forewarning based on an announcement of a meteorological agency, or to output an evacuation plan for damage of flooding and the typhoon to an output unit. If the host device 130 exists at a location at which the flooding and the typhoon occur, the host device 130 may enter an emergency mode to transmit information for notifying to another device that the host device 130 is damaged by the flooding and the typhoon.

For still another example, if the type of the risk is an earthquake 505 and a place where the earthquake occurs is identical to the current location of the host device 130 according to the parsed result of the situation information, the host device 130 enters an emergency mode to report the earthquake to another device, or output at least one of an evacuation plan for earthquake per place and a location which is the safest around the host device 130 to an output unit. If the type of the risk is the earthquake 505, the host device 130 may enter a warning mode to output at least one of the evacuation plan for earthquake per place and the location which is the safest around the host device 130 to the output unit.

For still another example, if the type of the risk is a traffic accident 507 and a place where the traffic accident occurs is within a predetermined range from the location of the host device 130 according to the parsed result of the situation information, the host device 130 may enter an emergency mode to report information about the location at which the traffic accident occurs to another device, or output time required to reach a destination or a detour to the destination to an output unit. If the type of the risk is the traffic accident 507 and the place where the traffic accident occurs is not within the predetermined range from the location of the host device 130, the host device 130 may enter a warning mode to output time required to reach the destination or the detour to the destination to the output unit.

An example of a method of controlling a neighboring device in a host device 130 in a communication system according to an embodiment of the present disclosure has been described above, and examples of transmitting and receiving a signal between a host device 130 and a neighboring device 150-1 in a communication system will be described with reference to FIGS. 6 and 7. At this time, it will be assumed that the neighboring device 150-1 is a device selected as a neighboring device to be controlled by the host device 130.

Figure 6:
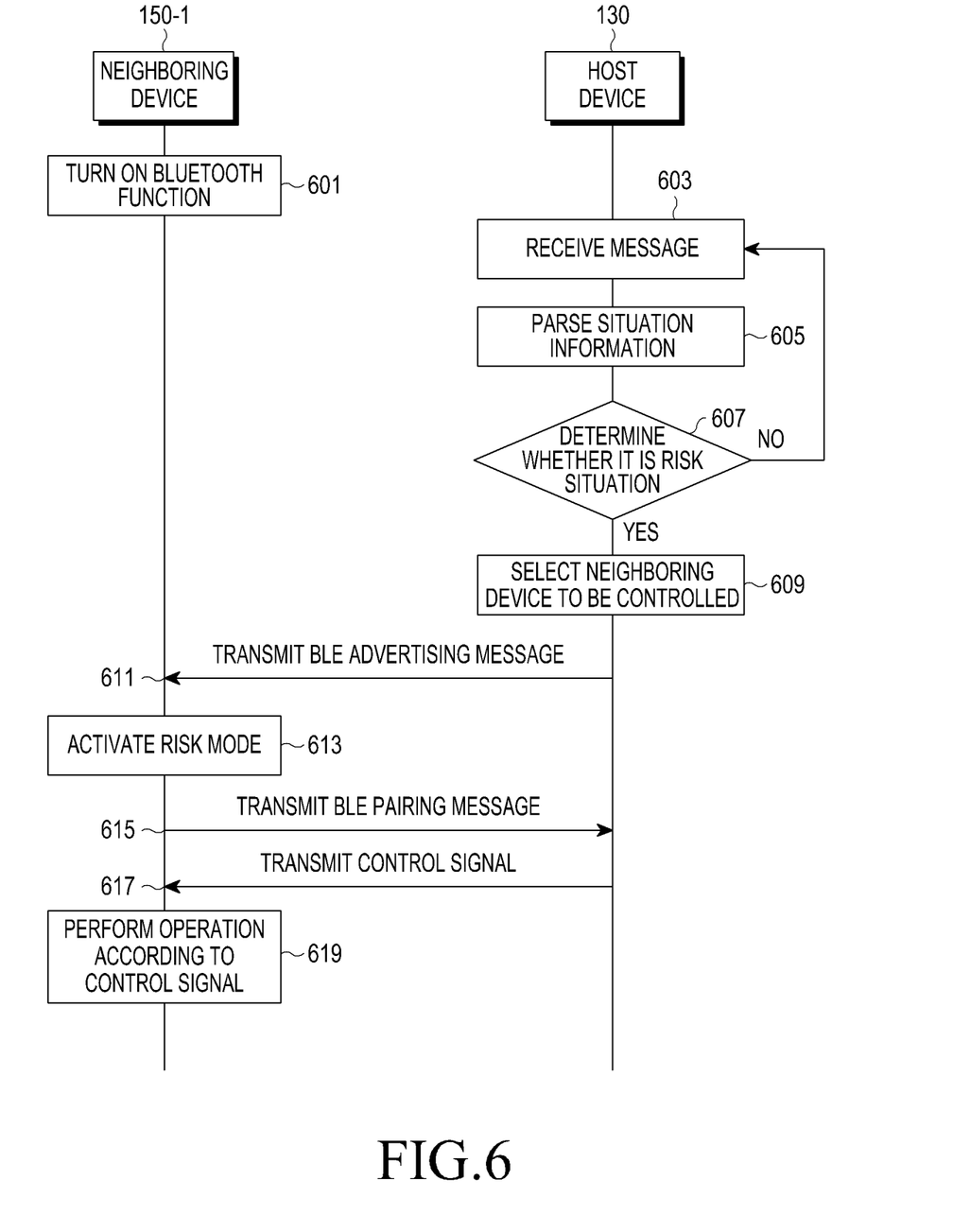
FIG. 6 illustrates an example of transmitting and receiving a signal between a host device and a neighboring device in a communication system according to an embodiment of the present disclosure.

FIG. 6 illustrates an example of transmitting and receiving a signal between a host device and a neighboring device in a communication system according to an embodiment of the present disclosure. An example in which a host device 130 and a neighboring device 1 150-1 perform a communication using Bluetooth is shown in FIG. 6, and the host device 130 and the neighboring device 1 150-1 may perform a communication each other using at least one communication method among portable terminal tagging (e.g., an NFC and an RFID), a QR code, a mobile communication network, a zigbee, WiFi, a UWB, VLC, IR, a Z-wave, and a human body communication.

Referring to FIG. 6, the neighboring device 1 150-1 turns on a Bluetooth function for performing a communication with at least one other device using Bluetooth (601).

Upon receiving a message including situation information related to a risk from a risk notification device 110 (603), the host device 130 parses the situation information included in the received message on a word basis (605). The host device 130 determines whether information about a risk situation is included in the parsed situation information based on at least one of a type of a risk, a place where the risk occurs, and scale of the risk (607). The type of the risk may be classified into, for example, fire, heavy rain, a typhoon, an earthquake, heat wave, cold wave, a traffic accident, and/or the like, and the place where the risk occurs may be classified into, for example, a house, a company, an inside of a building, an inside of a vehicle, an outside of the vehicle, and/or the like. The scale of the risk denotes a degree by which the risk is progressed, and may be classified into, for example, forewarning, warning, damage, and/or the like.

If the risk information is not included in the situation information, the host device 130 waits for reception of another message. If the risk information is included in the parsed situation information, the host device 130 selects a neighboring device 150-1 to be controlled from a preset control list as shown in FIG. 3 based on the risk information (609). At this time, the host device 130 may internally activate an emergency mode or a warning mode according to whether the risk information is related to an emergency situation before selecting the neighboring device 150-1 to be controlled as described in FIGS. 2 to 5.

The host device 130 transmits a BLE advertising message for requesting to operate on a risk mode to the neighboring device 150-1 (611).

After receiving the BLE advertising message from the host device 130, the neighboring device 150-1 activates a risk mode (613). The neighboring device 150-1 transmits a Bluetooth pairing message for performing a communication which uses Bluetooth with the host device 130 (615).

So, the host device 130 may transmit a corresponding control signal to the neighboring device 150-1 based on a preset control list (617). The control signal is a signal for controlling a device operation such that a risk situation may be overcome based on at least one of a location of the host device 130, a type of a risk, a place where the risk occurs, a function of the selected neighboring device 150-1, and a service which may be provided in the selected neighboring device 150-1. The neighboring device 150-1 receives the control signal from the host device 130, and may perform an operation according to the received control signal (619).

Figure 7:
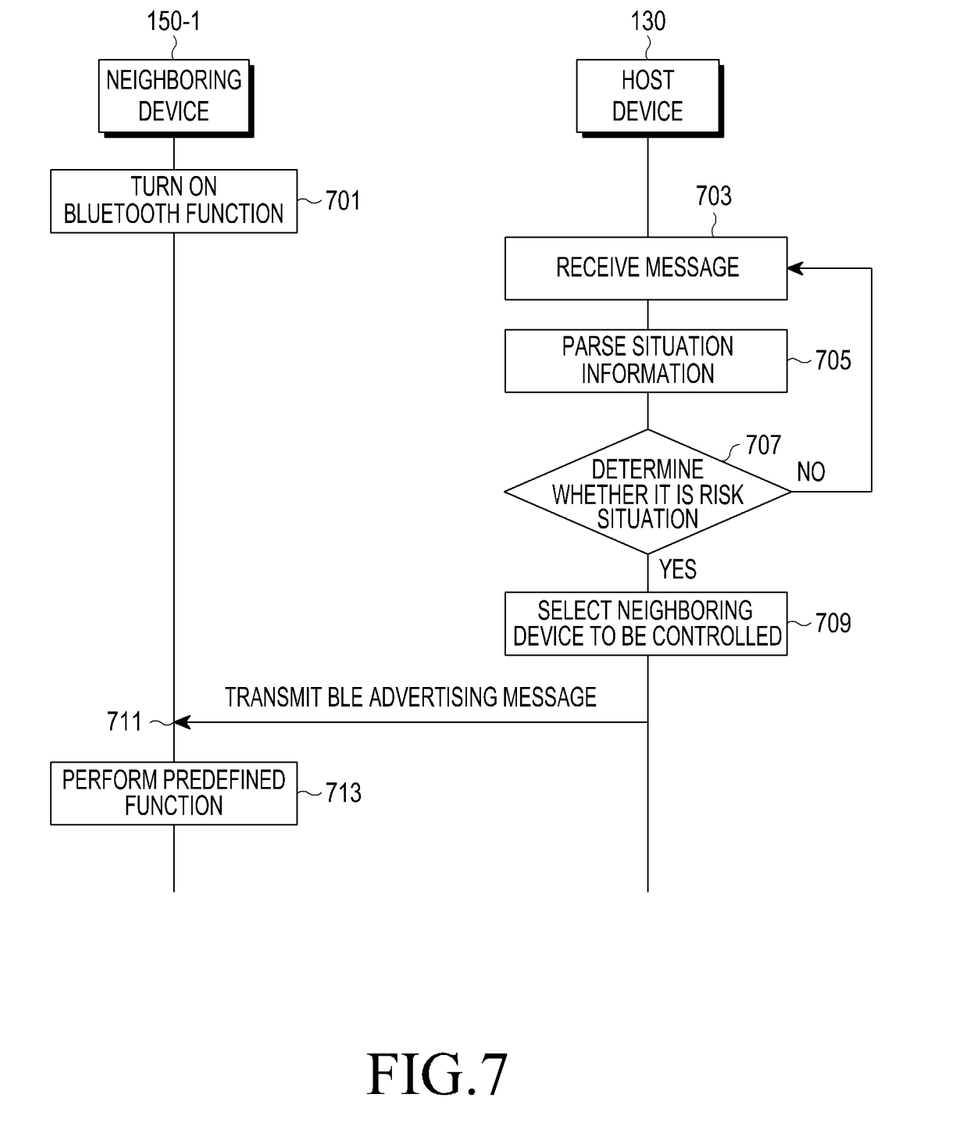
FIG. 7 illustrates another example of transmitting and receiving a signal between a host device and a neighboring device in a communication system according to an embodiment of the present disclosure.

For another example, the neighboring device 1 150-1 may automatically activate a risk mode as shown in FIG. 7 upon receiving a BLE advertising message for requesting to operate on a risk mode, and perform a function which is predefined to be performed when the risk mode is activated.

FIG. 7 illustrates another example of transmitting and receiving a signal between a host device and a neighboring device in a communication system according to an embodiment of the present disclosure. An example in which a host device 130 and a neighboring device 1 150-1 perform a communication using Bluetooth is shown in FIG. 7, and the host device 130 and the neighboring device 1 150-1 may perform a communication each other using at least one communication method among portable terminal tagging (e.g., an NFC and an RFID), a QR code, a mobile communication network, a zigbee, WiFi, a UWB, VLC, IR, a Z-wave, and a human body communication.

Referring to FIG. 7, the neighboring device 1 150-1 turns on a Bluetooth function for performing a communication with at least one other device using Bluetooth (701).

Upon receiving a message including situation information related to a risk from a risk notification device 110 (703), the host device 130 parses the situation information included in the received message on a word basis (705). The host device 130 determines whether information about a risk situation is included in the parsed situation information based on at least one of a type of a risk, a place where the risk occurs, and scale of the risk (707). If the risk information is not included in the situation information, the host device 130 waits for reception of another message. If the risk information is included in the parsed situation information, the host device 130 selects a neighboring device 150-1 to be controlled from a preset control list based on the risk information (709). At this time, the host device 130 may internally activate an emergency mode or a warning mode according to whether the risk information is related to an emergency situation before selecting the neighboring device 150-1 to be controlled as described in FIGS. 2 to 5.

The host device 130 transmits a BLE advertising message for requesting to operate on a risk mode to the neighboring device 150-1 (711).

After receiving the BLE advertising message from the host device 130, the neighboring device 150-1 activates a risk mode (713). The neighboring device 150-1 may perform a function which is predefined to be performed when the risk mode is activated (715).

So, the host device 130 may quickly cope with the risk situation by controlling the neighboring device which exists at the place where the risk actually occurs.

An example of transmitting and receiving a signal between a host device 130 and a neighboring device 150-1 in a communication system according to an embodiment of the present disclosure has been described above, and an inner structure of a host device 130 and a neighboring device will be described with reference to FIG. 8.

Figure 8:
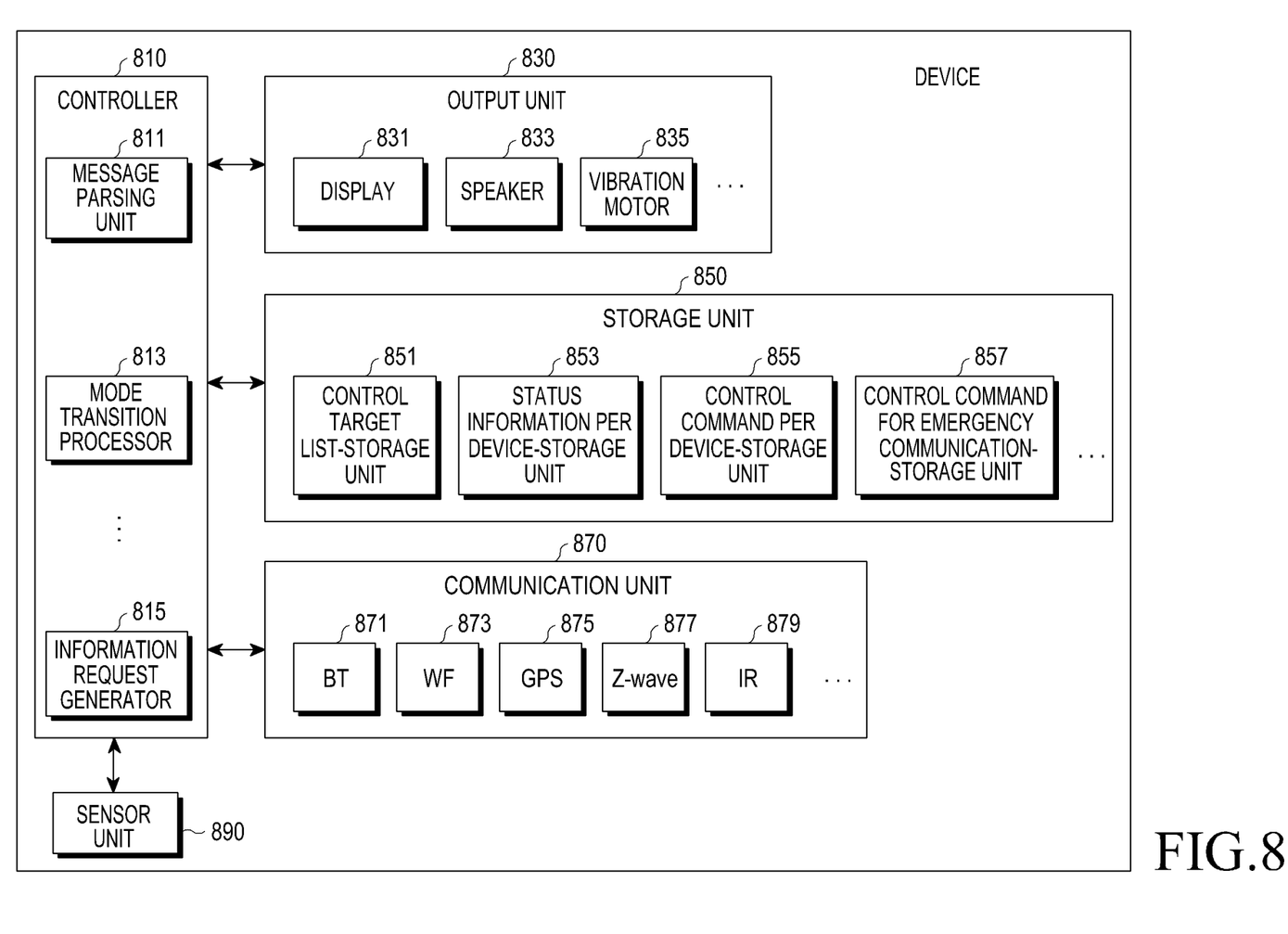
FIG. 8 illustrates an inner structure of a host device for performing an operation of controlling a device and a neighboring device in a communication system according to an embodiment of the present disclosure.

FIG. 8 illustrates an inner structure of a host device for performing an operation of controlling a device and a neighboring device in a communication system according to an embodiment of the present disclosure.

The host device 130 and the neighboring device are devices which correspond to a portable terminal or an IoT device. For convenience of description, the host device 130 and the neighboring device are defined and described as "device". Referring to FIG. 8, a device includes a controller 810, an output unit 830, a storage unit 815, a communication unit 870, and a sensor unit 890.

The controller 810 controls an overall operation of a device, and more particularly, controls an operation of entering an emergency mode or controlling a neighboring device when the device exists on a risk situation according to an embodiment of the present disclosure. For example, the controller 810 may include at least one of a message parsing unit 811, a mode transition processor 813, and an information request generator 815, and control an operation related to an operation of controlling a neighboring device according to an embodiment of the present disclosure. An operation of controlling a neighboring device which exists on a disaster situation according to an embodiment of the present disclosure has been described with reference to FIGS. 1 to 7, so a detailed description thereof will be described herein.

The output unit 830 outputs various signals and various message under a control of the controller 810. For example, the output unit 830 may include at least one of a display 831, a speaker 833, and a vibration motor 835, and output various signals and various message under a control of the controller 810. The various signals and various message output by the output unit 830 have been described with reference to FIGS. 1 to 7, so a detailed description thereof will be described herein.

The storage unit 850 stores a program, various data, and/or the like related to an operation related to an operation of controlling a neighboring device according to an embodiment of the present disclosure performed in the device under a control of the controller 810. The storage unit 850 stores various signals and various messages received from the other entities. For example, the storage unit 850 may include at least one of a control target list-storage unit 851, a status information per device-storage unit 853, a control command per device-storage unit 855, and a control command for emergency communication-storage unit 857.

The communication unit 870 transmits and receives various signals and various messages with other entities included in the communication system under a control of the controller 810. For example, the communication unit 870 may include at least one of a Bluetooth communication unit 871, a WiFi communication unit 873, a GPS communication unit 875, a Z-wave communication unit 877, and an IR communication unit 879. The various signals and various messages transmitted and received in the communication unit 870 have been described with reference to FIGS. 1 to 7, so a detailed description thereof will be described herein.

The sensor unit 890 receives various signals input from a user's body and the outside. The various signals transmitted and received in the sensor unit 890 have been described with reference to FIGS. 1 to 7, so a detailed description thereof will be described herein.

Although the controller 810, the output unit 830, the storage unit 850, the communication unit 870, and the sensor unit 890 are described as separate units in the device in FIG. 8, it is to be understood that the device may be implemented with a form into which at least two of the controller 810, the output unit 830, the storage unit 850, the communication unit 870, and the sensor unit 890 are incorporated. The device may be implemented with one processor.

An inner structure of a host device 130 and a neighboring device has been described above, and examples in which a host device 130 controls a neighboring device which exists on a risk situation in a communication system according to an embodiment of the present disclosure will be described with reference to FIGS. 9 and 10.

Figure 9:
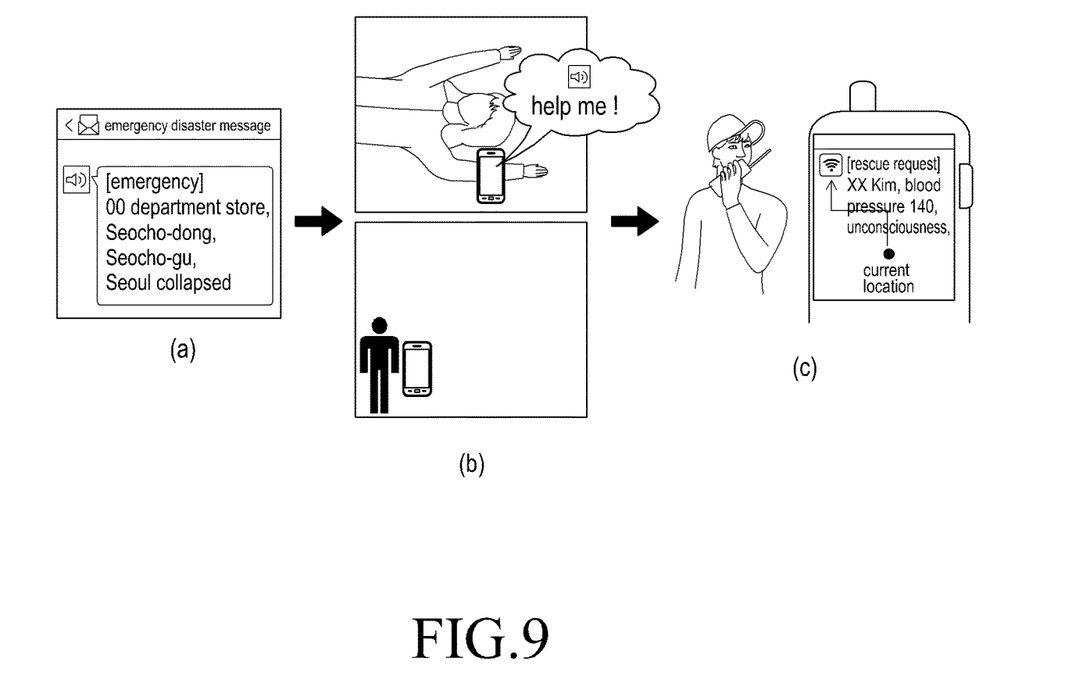
FIG. 9 illustrates an example in which a host device controls a neighboring device which is in a risk situation in a communication system according to an embodiment of the present disclosure.

FIG. 9 illustrates an example in which a host device 130 controls a neighboring device which exists on a risk situation in a communication system according to an embodiment of the present disclosure.

Referring to FIG. 9, a host device 130 receives a message from a risk notification device 110, and parses situation information included in the message on a word basis to identify risk information about at least one of a place where a risk occurs, a type of the occurred risk, and scale of the occurred risk as shown in (a). For example, in (a), the host device 130 may identify that the place where the risk occurs is 00 department store, Seocho-dong, Seocho-gu, Seoul, and the type of the occurred risk is collapse of a building from the message received from the risk notification device 110. The host device 130 selects at least one neighboring device to be controlled on a risk situation as shown in (b) from a preset control list based on the identified risk information, and transmits a control signal to the selected neighboring device. For example, in (b), if the neighboring device to be controlled is a terminal which may output a voice signal to another device and/or an inner output unit, the host device 130 transmits, to the neighboring device, a control signal for controlling to output a rescue request message. From this, the neighboring device outputs the rescue request message as shown in (b), so the rescue request message may be transferred to another device which is on a risk situation and located within a predetermined distance. The neighboring device which is on the risk situation may output the rescue request message by the host device 130, the neighboring device which is on the risk situation may quickly request rescue from the another device which is on the risk situation and located within the predetermined distance even though a user may not request rescue.

Figure 10:
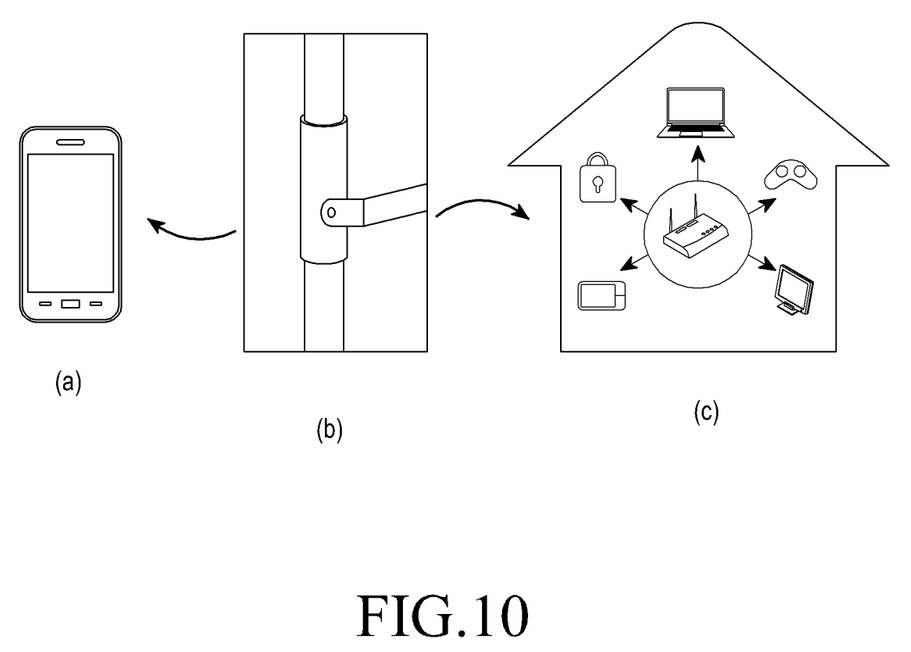
FIG. 10 illustrates another example in which a host device controls a neighboring device which is in a risk situation in a communication system according to an embodiment of the present disclosure.

FIG. 10 illustrates another example in which a host device 130 controls a neighboring device which exists on a risk situation in a communication system according to an embodiment of the present disclosure.

Referring to FIG. 10, a host device 130 receives a message from a risk notification device 110, and parses situation information included in the message on a word basis to identify risk information about at least one of a place where a risk occurs, a type of the occurred risk, and scale of the occurred risk as shown in (a). For example, in (a), the host device 130 may identify that the place where the risk occurs is home (a user's house), and the type of the occurred risk fire from the received message. The host device 130 selects at least one neighboring device to be controlled from a preset control list based on the identified risk information, and transmits a control signal to the selected neighboring device. For example, in (b), if fire occurs at home, the host device 130 selects an adjusting device of a gas valve as the neighboring device to be controlled, and transmits, to the adjusting device of the gas valve, a control signal for controlling to turn off the adjusting device of the gas valve. From this, the adjusting device of the gas valve is controlled to turned off as shown in (b), and gas provision to all devices to which gas is provided may be shut off as shown in (c). A neighboring device which is on a risk situation may be controlled with a preset operation by the host device 130, so a neighboring device which is at home may be quickly controlled even though a user is not at home.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:
1. A method for controlling, by a portable device, at least one device configured to communicate with the portable device in a communication system, comprising:
receiving, by the portable device, a message from a server for notifying a risk;

parsing text data of the message on a word basis to determine whether risk information is included in the text data of the message in response to the risk information being included in the text data of the message, determining whether the risk information is related to an emergency situation based on the risk information and information related to a location of the portable device, and selecting at least one device to be controlled corresponding to the risk information; and transmitting a control signal, from the portable device, which corresponds to the risk information to the selected at least one device, wherein if the risk information is related to the emergency situation, activating only functions related to an emergency mode.

2. The method of claim 1, wherein the message is one of a text message including uniform resource locator (URL) information which is capable of being connected on an emergency mode, a disaster text message received from a disaster agency server, an information message provided from a social network service (SNS), a push notification message, and a text message received from a server included in a place where the disaster occurs.

3. The method of claim 1, wherein the selecting further comprises selecting the at least one device from a preset control list based on the risk information.

4. The method of claim 3, wherein the preset control list is generated according to at least one of a location of the portable device, the risk information, and a preset method.

5. The method of claim 3, wherein the control signal is a signal for indicating a function to be activated corresponding to the risk information to the selected at least one device based on the preset control list.

6. The method of claim 1, wherein the portable device and the selected at least one device perform a communication each other using at least one communication method among device tagging, radio frequency identification (RFID), a quick response (QR) code, a mobile communication network, zigbee, Bluetooth, Bluetooth low energy (BLE), WiFi, a ultra wide band (UWB), a visible light communication (VLC), an infrared ray (IR), a Z-wave communication, and a human body communication.

7. A portable device for controlling at least one device configured to communicate with a portable device in a communication system, comprising:
a communication unit; and
a processor operably connected to the communication unit;
wherein the processor is configured to:
receive a message from a server for notifying a risk,
parse the text data of the message on a word basis to determine whether risk information is included in the text data of the message
in response to the risk information being included in text data of the message, select at least one device to be controlled corresponding to the risk information; and
transmit a control signal which corresponds to the risk information to the selected at least one device; and
determine whether the risk information is related to an emergency situation based on the risk information and information related to a location of the portable device in response to the risk information being included in the text data of the message, and to activate only functions related to an emergency mode if the risk information is related to the emergency situation.

8. The portable device of claim 7, wherein the message is one of a text message including uniform resource locator (URL) information which is capable of being connected on an emergency mode, a disaster text message received from a disaster agency server, an information message provided from a social network service (SNS), a push notification message, and a text message received from a server included in a place where the disaster occurs.

9. The portable device of claim 7, wherein the risk information includes information related to at least one of a place where a risk occurs, a type of the risk, and scale of the risk.

10. The portable device of claim 7, wherein a preset control list is generated according to at least one of a location of the portable device, the risk information, and a preset method.

11. The portable device of claim 7, wherein the portable device and the selected at least one device perform a communication each other using at least one communication method among device tagging, radio frequency identification (RFID), a quick response (QR) code, a mobile communication network, zigbee, Bluetooth, Bluetooth low energy (BLE), WiFi, a ultra wide band (UWB), a visible light communication (VLC), an infrared ray (IR), a Z-wave communication, and a human body communication.

12. The method of claim 1, wherein the risk information includes information related to at least one of a place where a risk occurs, a type of the risk, and scale of the risk.

13. The method of claim 4, wherein the preset control list is updated according the location of the portable device.

14. The portable device of claim 7, wherein the controller is configured to select the at least one device from a preset control list based on the risk information.

15. The portable device of claim 14, wherein the control signal is a signal for indicating, through the communication unit, a function to be activated corresponding to the risk information to the selected at least one device based on the preset control list.

16. The portable device of claim 10, wherein the preset control list is updated according the location of the portable device.

17. The method of claim 1, further comprising:
determining a location of the portable device,
wherein at least one of the selecting of the at least one device and the control signal is based on the determined location of the portable device.

18. The portable device of claim 7, further comprising:
a location detector to determine a location of the portable device,
wherein at least one of the selecting of the at least one device and the control signal is based on the determined location of the portable device.

19. The method of claim 1, wherein the selecting of the at least one device further comprises selecting the at least one device from a preset control list based on the risk information and a location of the portable device.

20. The portable device of claim 7, wherein the selecting of the at least one device further comprises selecting the at least one device from a preset control list based on the risk information and a location of the portable device.

* * * * *